(12) United States Patent
Takeuchi

(10) Patent No.: US 6,409,598 B1
(45) Date of Patent: Jun. 25, 2002

(54) METHOD, PROGRAM PRODUCT, AND GAME SYSTEM FOR BLURRING AN IMAGE

(75) Inventor: Hisahiko Takeuchi, Tokyo (JP)

(73) Assignees: Square Co., Ltd.; Dream Factory Co., Ltd., both of Tokyo (JP)

( * ) Notice: Subject to any disclaimer, the term of this patent is extended or adjusted under 35 U.S.C. 154(b) by 0 days.

(21) Appl. No.: 09/559,126

(22) Filed: Apr. 28, 2000

(51) Int. Cl.[7] .................................................. A63F 9/24
(52) U.S. Cl. ........................................ 463/31; 345/418
(58) Field of Search ............................. 463/1, 3, 4, 30, 463/31, 32, 33, 34; 345/418, 419, 425, 426, 427, 432, 422, 433

(56) References Cited

U.S. PATENT DOCUMENTS

| | | | |
|---|---|---|---|
| 5,570,433 A | * 10/1996 | Nagamine et al. | 382/255 |
| 5,995,111 A | * 11/1999 | Morioka et al. | 345/429 |
| 6,034,690 A | *  3/2000 | Gallery et al. | 345/419 |
| 6,148,113 A | * 11/2000 | Wolverton et al. | 382/255 |
| 6,157,387 A | * 12/2000 | Kotani | 345/431 |
| 6,201,517 B1 | *  3/2001 | Sato | 345/7 |

FOREIGN PATENT DOCUMENTS

| | | |
|---|---|---|
| JP | 6-139353 | 5/1994 |
| JP | 10222694 | 8/1998 |
| JP | 11120377 | 4/1999 |

\* cited by examiner

Primary Examiner—Jessica J. Harrison
Assistant Examiner—Kim T. Nguyen
(74) Attorney, Agent, or Firm—Greenblum & Bernstein, P.L.C.

(57) ABSTRACT

A method of blurred drawing processing for three-dimensional computer image processing and a computer readable program product storing a program and video game system for the same are provided which display a virtual three-dimensional space on a screen having the effect of a depth of field free from an unnatural feeling without increasing the load of the blurred drawing processing. That is, the effect is achieved without increasing the number of steps of blurring degree given in the depth direction of the virtual three-dimensional space. The invention converts a three-dimensional image to a two-dimensional image, and acquires depth data showing a depth position in the virtual three-dimensional space of the two-dimensional image. The invention also repeatedly performs blurring processing for blurring the two-dimensional image at the deeper side from a threshold value for each of a plurality of threshold values set in steps in the depth direction of the virtual three-dimensional space. The invention also performs semitransparency processing on the two-dimensional image at the deeper side from the threshold value with each blurring processing.

18 Claims, 8 Drawing Sheets

LARGE ← Z-VALUE → SMALL

FRONT SIDE ← → DEPTH SIDE

METHOD, PROGRAM PRODUCT, AND GAME SYSTEM FOR BLURRING AN IMAGE

BACKGROUND OF THE INVENTION

1. Field of the Invention

The present invention relates to a method, program product, and game system for blurring an image. More particularly, the present invention relates to a method of blurred drawing processing for three-dimensional computer image processing and a computer readable program product storing a program and video game system for the same.

2. Description of the Related Art

In image processing for three-dimensional computer games used by video game systems, processing the image so as to give the image drawn in the virtual three-dimensional space of the monitor screen a blurred effect like that according to the depth of an object etc. and drawing the image in a non-focused state has already been proposed. This type of image processing technique is disclosed in Japanese Unexamined Patent Publication (Kokai) No. 6-139353, Japanese Unexamined Patent Publication (Kokai) No. 10-222694, etc.

Summarizing the problems to be solved by the invention, blurred drawing processing gradually increases the blurring degree the further toward the deep side of the virtual three-dimensional space such as with the effect of a depth of field in an image taken by a camera and gives a naturally appearing non-focused image. While it is possible to change the blurring degree given in the depth direction of the virtual three-dimensional space step by step, the greater the number of steps of the blurring degree, the larger the load in the blurred drawing processing and the more high speed drawing is obstructed.

If therefore reducing the number of steps of the blurring degree given in the depth direction of the virtual three-dimensional space, the difference in the blurring effect in the interface area between an image of a large blurring degree and an image of a small degree becomes uniformly large and therefore an unnaturally appearing image of a virtual three-dimensional space is displayed.

In particular, in a fighting game where an enemy character designed to fight with the player character moves between a front side and deep side of the virtual three-dimensional space, when the enemy character moves between the front side and deep side of the virtual three-dimensional space, the displayed image (blurring degree) of the enemy character changes by an extreme amount and appears unnatural. For example, when the enemy character moves from the deep side to the front side in the virtual three-dimensional space, the blurred displayed image of the enemy character abruptly changes to a highly focused image. There is an unnatural change in scene where it appears that the enemy character breaks through a curtain of fog.

SUMMARY OF THE INVENTION

An object of the present invention is to provide a method of blurred drawing processing, and a computer readable program product storing a program for three-dimensional computer image processing and a video game system for the same, enabling the display of a virtual three-dimensional space on a screen having the effect of a depth of field free from an unnatural feeling without increasing the load of the blurred drawing processing, that is, without increasing the number of steps of blurring degree given in the depth direction of the virtual three-dimensional space.

According to a first aspect of the present invention, there is provided a method for blurring a scene of a game, the method including setting a depth from any perspective point for a scene in a virtual space, setting a blurring degree higher the deeper the set depth, executing blurring processing on said scene based on the set blurring degree, and displaying the scene obtained by the executed blurring processing.

According to a second aspect of the present invention, there is provided a computer readable program product storing a game program, the program making the computer set a depth from any perspective point for a scene in a virtual space, set a blurring degree higher the deeper the set depth, executing blurring processing based on said set blurring degree to said scene, and displaying the scene obtained by said executed blurring processing.

According to a third aspect of the present invention, there is provided a game system provided with a unit for playing a game in accordance with a program, a memory for storing all or part of the program, and a display screen for displaying a game played by the unit, the unit, in accordance with the program stored in the memory, setting a depth from any perspective point for a scene in a virtual space, setting a blurring degree higher the deeper the set depth, executing blurring processing on said scene based on the set blurring degree, and displaying the scene obtained by the executed blurring processing.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Preferred embodiments of the present invention will be explained below with reference to the drawings.

Figure 1:
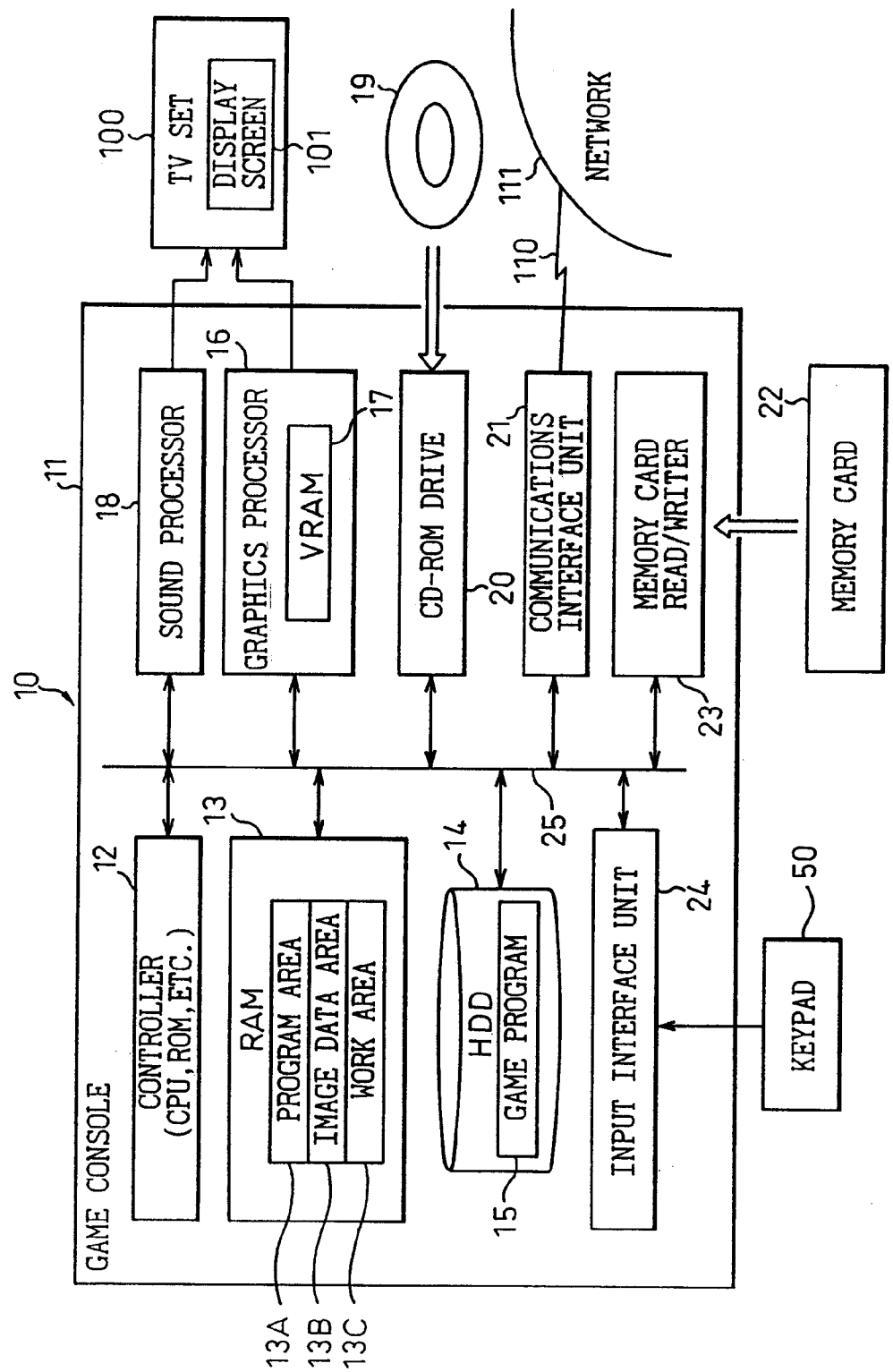
FIG. 1 is a block diagram of a video game system according to an embodiment of the present invention.

FIG. 1 shows a video game system according to an embodiment of the present invention. The video game system executes a program stored in a computer readable program product according to the present invention and is used for working a method of blurred image drawing processing in three-dimensional computer image processing according to the present invention.

The video game system 10 is, for example, comprised of a game console 11 and a keypad 50 connected to an input side of the game console 11. A television set 100 having a cathode ray tube (CRT) etc. is connected to an output side of the game console 11 as a monitor with speakers. The keypad 50 is operated by a user (operator) for giving user operating instructions to the game console 11. The television set 100 displays a video (image) and outputs sounds in accordance with the content of the game based on a video signal (image signal) or sound signal from the game console 11.

The game console 11 is for example comprised of a controller 12 including a central processor (CPU), read only memory (ROM), etc., and a random access memory (RAM) 13. In the RAM, a program storage area 13A, image data area 13B, and work area 13C are defined. The game console also includes a hard disk drive 14 able to store a game program on a hard disk (program product) 15, a graphics processor 16 having a video RAM (VRAM) 17, and a sound processor 18 generating background music, sound effects, and other sound signals in accordance with commands from the controller 12. The game console 11 further includes a compact disk ROM (CD-ROM) drive 20 for reading a game program, image data, sound data, etc. stored in a program product, a CD-ROM 19, a communications interface unit 21 connected selectively to the network 111 by a communications line 110 for data communications with other devices, a memory card read/writer 23 for reading and writing from and to a memory card 22 storing data on the interim progress of the game, data on the game environment settings, and other saved data, an input interface unit 24 for receiving an input signal from a keypad 50, and a bus 25 for connecting these.

The controller 12 executes the game program stored in the program area 13A of the RAM 13, in this case, a program of a fighting game. Due to this, the image of the later explained fighting game is displayed.

The RAM 13 has defined in it a program area 13A for storing the program of a fighting game etc., an image data area 13B for storing the background, game characters, and other image data required in the process of execution of a program, a work area 13C for storing various types of data produced in the process of execution of the program, etc. and stores the game program and image data read by the CD-ROM drive 20 from the CD-ROM 19 in the areas. Further, the game program or image data may be stored in the hard disk 15 of the hard disk drive 14.

Figure 2:
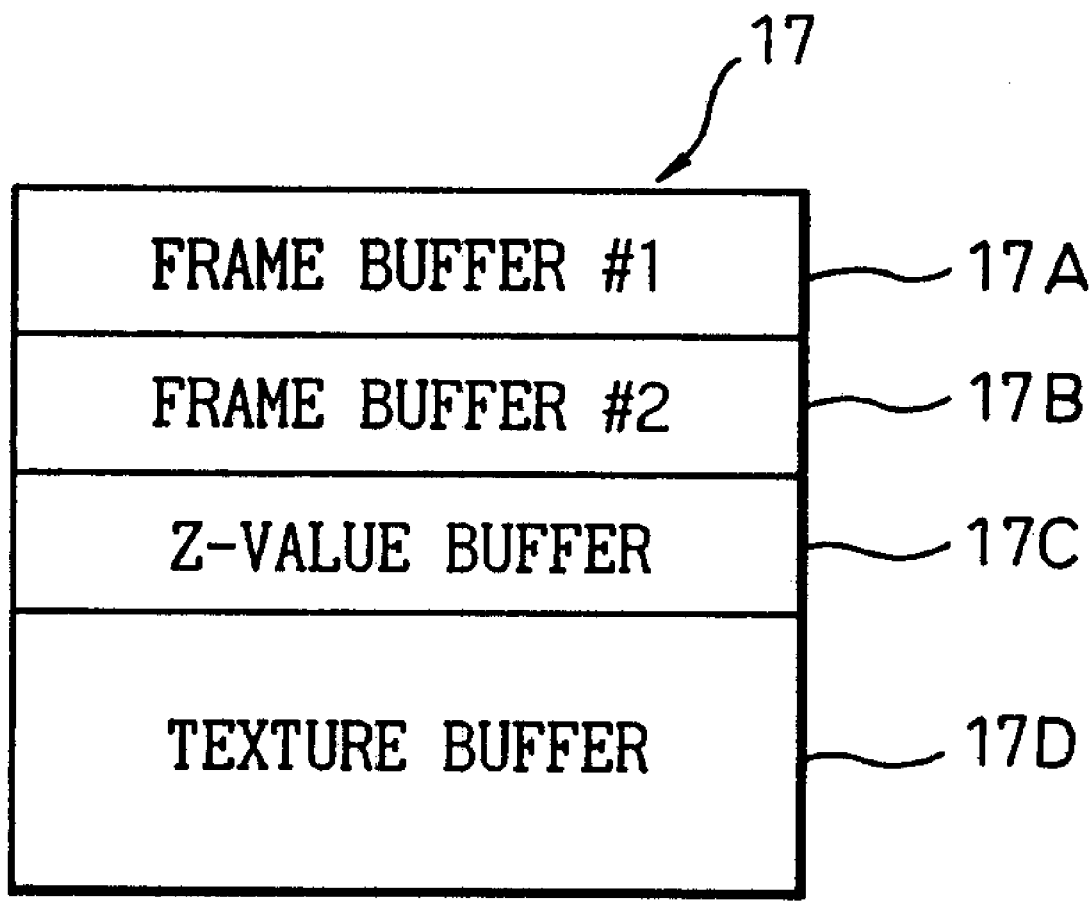
FIG. 2 is a view explaining the internal configuration of a VRAM of a video game system according to the present invention.

The VRAM 17 of the graphics processor 16, as shown in FIG. 2, has defined in it two (#1 and #2) frame buffers 17A and 17B for storing pixel data for display on a screen, a Z-value buffer 17C for storing a Z-value showing a position in a depth direction in the virtual three-dimensional space for each pixel in the frame buffers 17A and 17B, and a texture buffer 17D for storing texture data required for polygon display. Note that the Z-value is larger closer up and smaller further away in the virtual three-dimensional space.

The graphics processor 16 generates a video signal based on the image data stored in the frame buffer 17A or 17B based on commands from the controller 12 along with execution of the program and outputs the video signal to the television set 100. Due to this, an image is displayed based on the image data stored in the frame buffer 17A or 17B on the display screen 101 of the television set 100.

The computer readable program product according to the present invention is a computer readable program product storing a fighting game or other game program. The program product is for example comprised of a CD-ROM 19 or hard disk 15. By executing the program stored in the program product in a computer, the following processing is performed by the computer. That is, the computer converts a three-dimensional image to a two-dimensional image by transparent conversion and acquires depth data showing the depth position in the virtual three-dimensional space of the two-dimensional image, that is, the Z-value. It refers to the Z-data and repeatedly performs blurring processing for blurring the two-dimensional image at the deeper side from a threshold value for every one of a plurality of threshold values set in steps in the depth position of the virtual three-dimensional space. At that time, the two-dimensional image at the deeper side from a threshold value is subjected to semitransparency combination processing with each blurring processing. In this semitransparency combination processing, two images to be combined are lowered in brightness and then added and combined. Hereinafter, this semitransparency combination processing will be referred to as merely semitransparency processing.

The blurring processing can be performed by reducing and enlarging a two-dimensional image and perform bilinear filtering at the time of reduction and enlargement. The semitransparency processing can be performed by combining images using alpha-blending etc. The semitransparency processing can be performed by a higher semitransparency value (however, semitransparency value 0=transparent) the deeper the two-dimensional image in the virtual three-dimensional space the blurring processing is performed on.

Next, an explanation will be made of the operation of a video game system 10 according to the above configuration with reference to the flowchart shown in FIG. 3, FIG. 4, and FIG. 5. Note that the processing after this is performed by the controller 12 of the game console 11 executing the game program.

Figure 3:
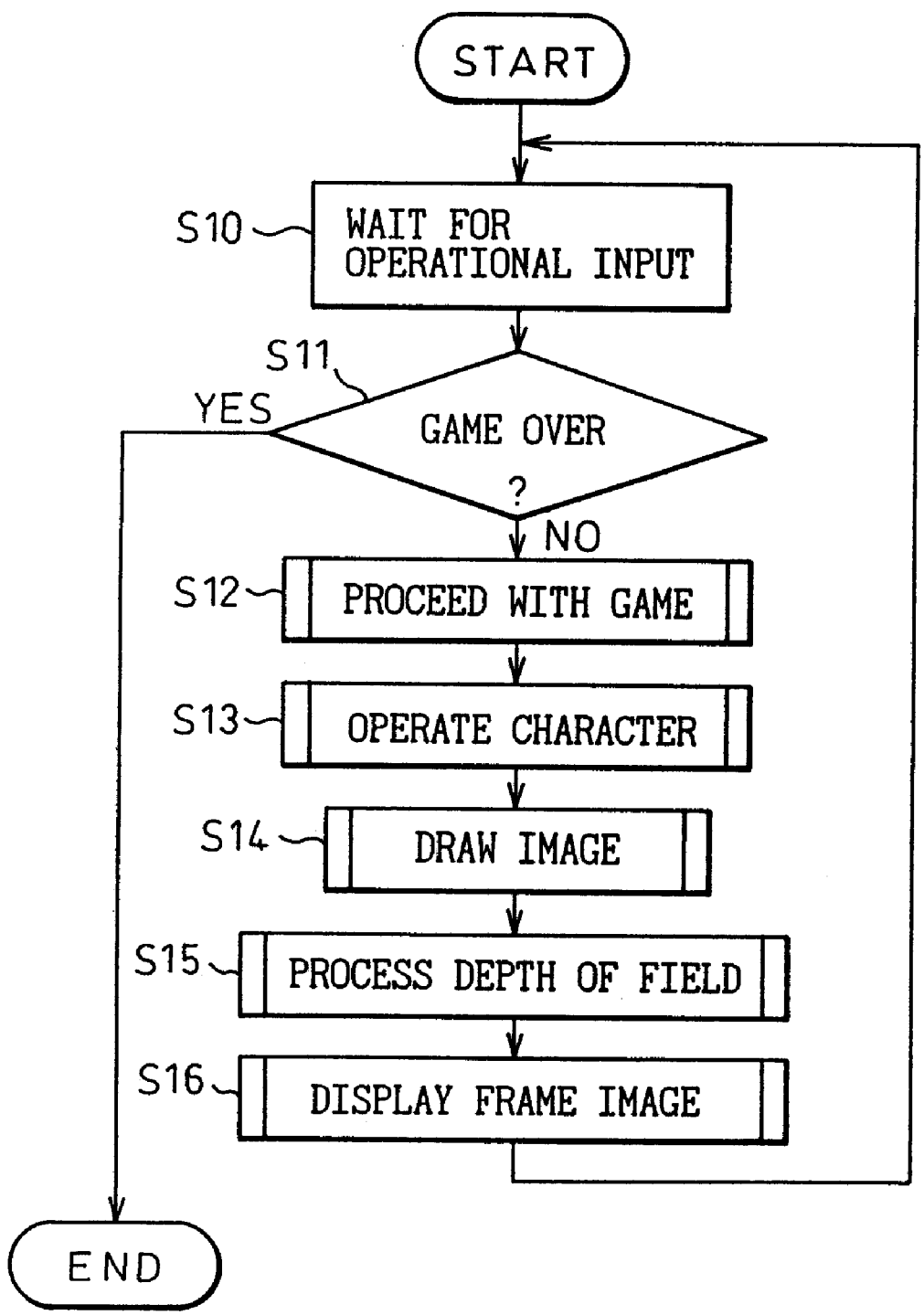
FIG. 3 is a flowchart of the general flow of execution of a game program by a video game system according to the present invention.

FIG. 3 shows the flow of processing of the game as a whole. The controller 12 waits for the operational input from the keypad 50 (step S10). If the input is for ending the game (YES at step S11), the controller 12 ends the processing. If the input is other than one for ending the game (NO at step S11), the controller 12 performs the predetermined processing for progress of the game in accordance with the game program in response to operational input (step S12), performs processing for operation of the character based on the results of processing for progress of the game (step S13), then performs the predetermined image drawing processing (step S14), depth-of-field (blurring) processing (step S15), and frame image display processing (step S16) in that order. After step S16, the flow returns to step S10 to wait for operational input.

Figure 4:
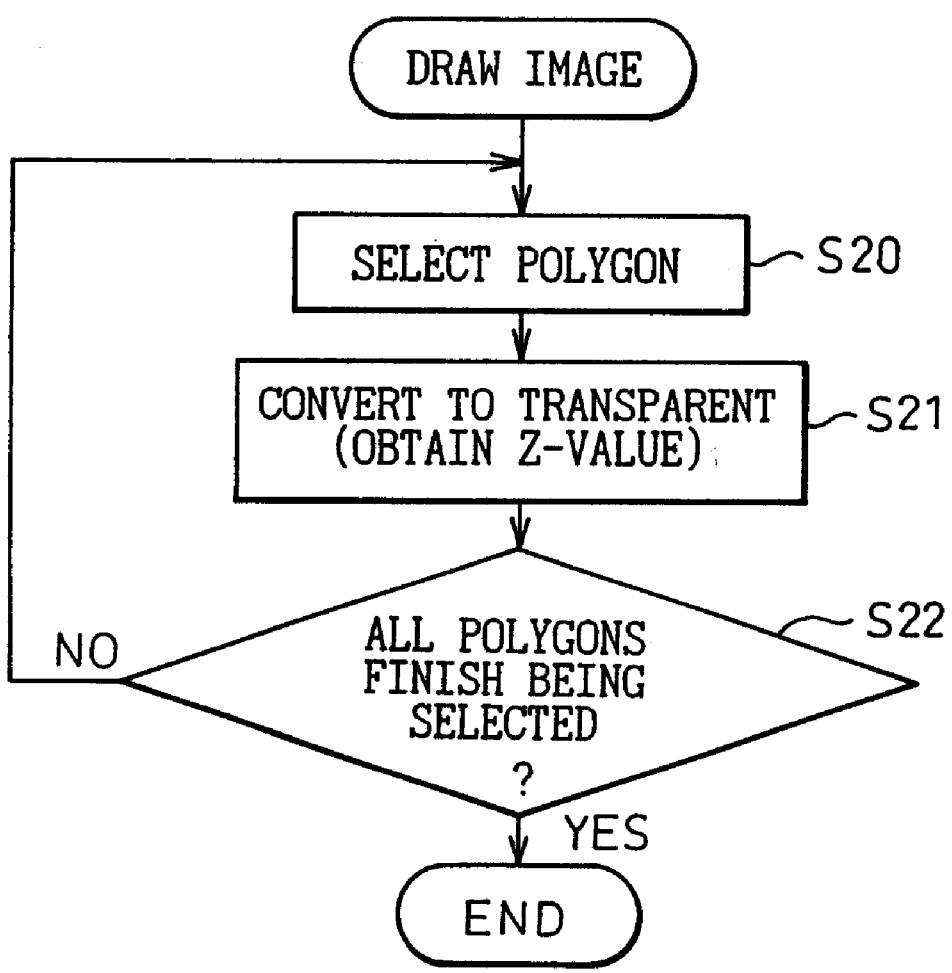
FIG. 4 is flowchart of the flow of image drawing processing in the blurred drawing processing method according to the present invention.

FIG. 4 shows the flow of image drawing processing. In image drawing processing, the controller 12 selects one polygon at a time (step S20). It makes the selected polygon transparent, converts the three-dimensional image to a two-dimensional image, and acquires a Z-value as depth data showing the depth position in the virtual three-dimensional space of the two-dimensional image (step S21). The controller 12 then repeats the above processing until all of the polygons have finished being selected (step S22).

Figure 5:
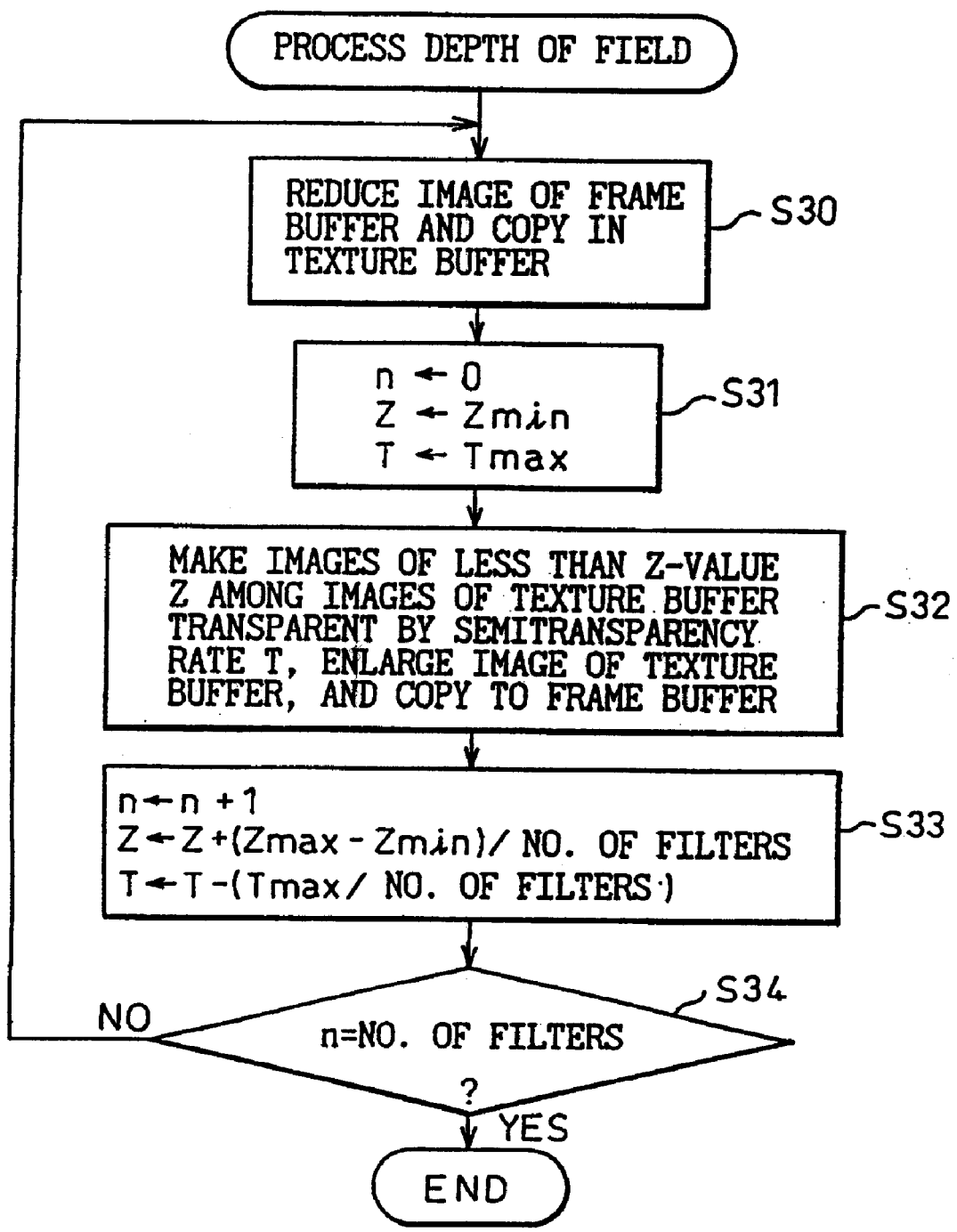
FIG. 5 is a flow chart of the depth-of-field processing in the blurred drawing processing method according to the present invention.
Figure 6A:
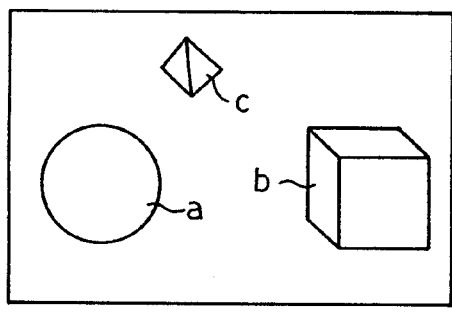
FIG. 6A is a first view schematically explaining the execution of the blurred drawing processing method according to the present invention.
Figure 6B:
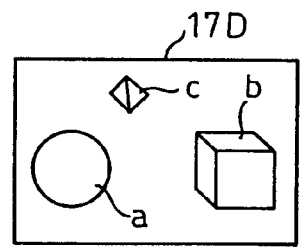
FIG. 6B is a second view schematically explaining the execution of the blurred drawing processing method according to the present invention.
Figure 7:
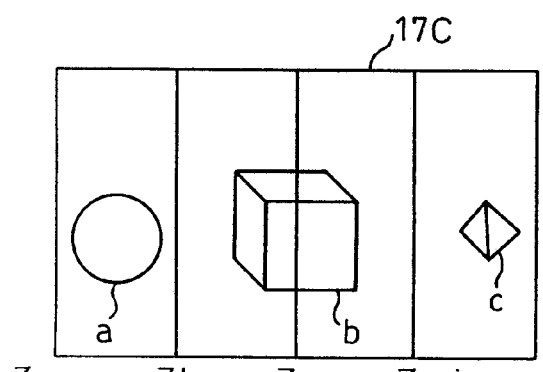
FIG. 7 is a view explaining the relation between the Z-value and threshold value of the blurring processing in the blurred drawing processing method according to the present invention.

FIG. 5 shows the flow of the depth-of-field processing. The depth-of-field processing is blurring processing. First, the graphics processor 16 reduces the images a, b, and c of the frame buffer 17A or 17B as shown schematically in FIG. 6A and FIG. 6B and copies the content to the texture buffer 17D (step S30). In this case, as shown in FIG. 7, the image a is at the frontmost side of the virtual three-dimensional space and the image b and image c are deeper in the three-dimensional space, in that order. Note that the minimum value Zmin to maximum value Zmax are blurring areas and may be set as parameters.

Figure 6C:
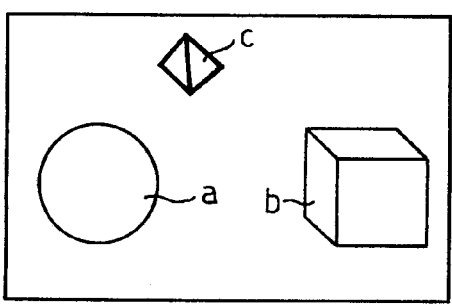
FIG. 6C is a third view schematically explaining the execution of the blurred drawing processing method according to the present invention.
Figure 6D:
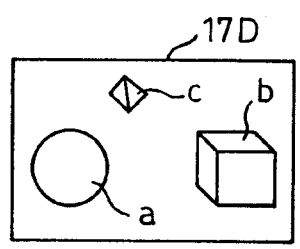
FIG. 6D is a fourth view schematically explaining the execution of the blurred drawing processing method according to the present invention.

Next, the controller 12, as initialization, sets the number n of filterings (number of executions of blurring processing) to "0", the Z-value Z to the minimum value Zmin (see FIG. 7), and the semitransparency value T to the maximum value Tmax set as a parameter (step S31). The graphics processor 16 performs semitransparency processing on an image of a Z-value not more than Z, in this case, not more than the minimum value Zmin, among the images of the texture buffer 17D under the command of the controller 12 by a semitransparency value T (maximum value Tmax), enlarges the image of the texture buffer 17D to the original size, and copies the result in the frame buffer 17A or 17B (step S32). FIG. 6C and FIG. 6D schematically show the processing for enlargement and copying of an image. In this example, the image of the texture buffer is combined with that in the frame buffer A semitransparently. Bilinear filtering is performed at the time of the above reduction of the image and enlargement of the image, whereby a blurred image is obtained.

As shown in FIG. 7, since just the image c among the images a, b, and c is deeper in the virtual three-dimensional space than the minimum value Zmin, as shown in FIG. 6C and FIG. 6D, the image c is given a blurred effect by the bilinear filtering and is made semitransparent by the maximum value Tmax. The image becomes transparent at a semitransparency value T of "0", so the larger the value, the smaller the semitransparency effect.

When the above filter processing and semitransparency processing end, the controller 12 increments the number of times n of filtering by 1 to make it "1" increments the Z-value Z by the value of {(maximum value Zmax−minimum value Zmin)/number of filters} to make it the Z-value Z=Za (see FIG. 7), and decrements the semitransparency value T by the value of (maximum value Tmax/number of filters) (step S33).

The number of filters is the number of times of blurring processing and semitransparency processing (set value) able to be set as a parameter. When the number of times n of filtering becomes the number of filters, for example, "4", the controller 12 considers that the predetermined number of times of blurring processing and semitransparency processing to have ended and ends the depth-of-field processing (YES at step S34).

Up until the number of times n of filtering reaches the number of filters (NO at step S34), the controller 12 returns to step S30 where it changes the Z-value Z and the semitransparency value T and repeatedly performs filter processing and semitransparency processing in the same way as the above filtering processing and semitransparency processing.

Due to this, the following processing is performed. The second time, the graphics processor 16 performs semitransparency processing on an image of a Z-value not more than Za by a value of the semitransparency value T=T−(maximum value Tmax/4) and enlarges the image of the texture buffer 17D to the original size in the bilinear filter processing. It then copies the enlarged image in the frame buffer 17A or 17B. The third time, the graphics processor 16 performs semitransparency processing on an image of a Z-value not more than Zb by a value of the semitransparency value T=T−2(maximum value Tmax/4) and enlarges the image of the texture buffer 17D to the original size in the bilinear filter processing. It then copies the enlarged image in the frame buffer 17A or 17B.(step S32). The fourth time, the graphics processor 16 performs semitransparency processing on an image of a Z-value not more than Zmax by a value of the semitransparency value T=T−3(maximum value Tmax/4) and enlarges the image of the texture buffer 17D to the original size in the bilinear filter processing. It then copies the enlarged image in the frame buffer 17A or 17B.

In the processing of this embodiment, the deeper the depth of the image, the greater the number of times of combination of the blurred image. As a result, a strong blurring effect is obtained at the deeper images.

Further, the semitransparency processing is performed by a higher semitransparency value the deeper the two-dimensional image in the virtual three-dimensional space due to the above processing subjected to the blurring processing.

Figure 8:
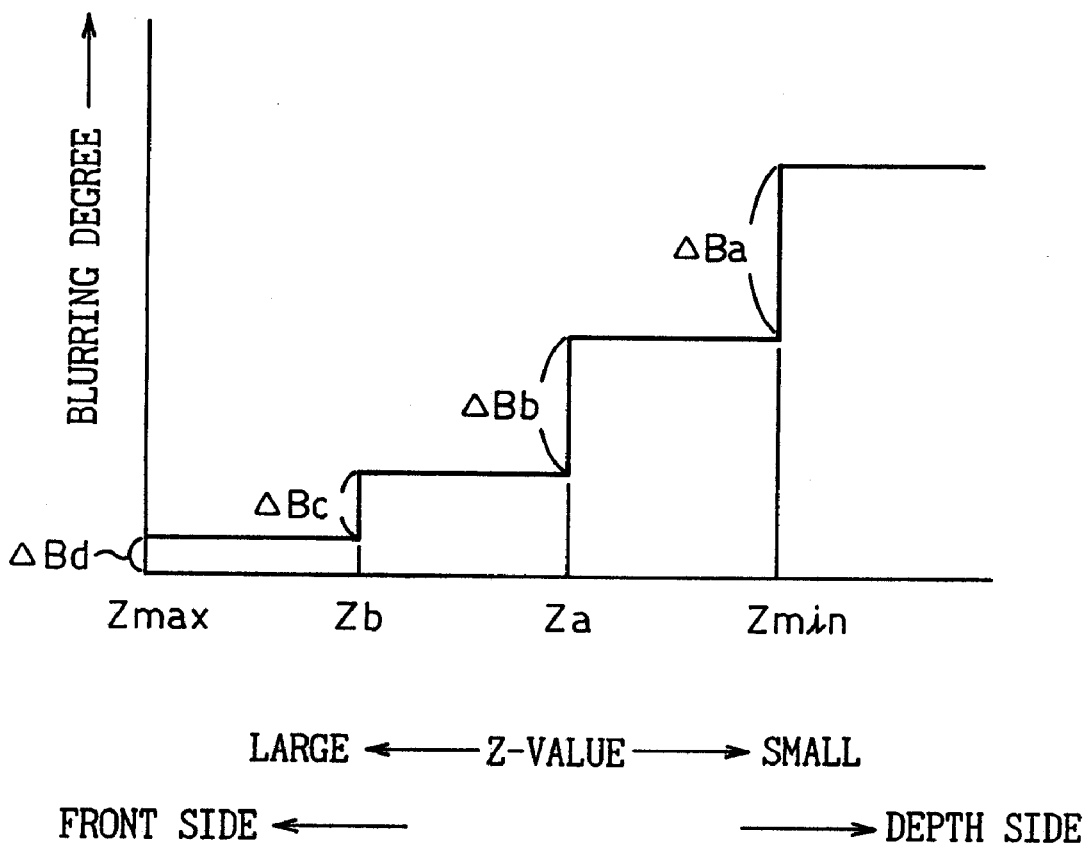
FIG. 8 is a graph of the relation between the Z-value and blurring degree in the blurred drawing processing method according to the present invention.

In other words, the semitransparency processing is performed by a higher transparency the further to the front side of the virtual three-dimensional space the two-dimensional image. Due to this, the deeper the two-dimensional image in the virtual three-dimensional space subjected to the blurring processing, the strong the effect obtained. As shown in FIG. 8, the more from the deep side to the front side of the virtual three-dimensional space, the greater the difference Ba, Bb, Bc, and Bd of the blurring degree in the blurring processing, that is, Ba>Bb>Bc>Bd.

Due to this, after securing the required blurring degree at the deepest side of the virtual three-dimensional space, the closer from the deep side to the front side of the virtual three-dimensional space, that is, the closer to the focused area, the less the difference in blurring effect in the interface area between an image of a larger blurring degree and an image of a smaller degree. As a result, the image of a virtual three-dimensional space having a naturally appearing depth-of-field effect not giving an unnatural feeling is obtained without increasing the number of steps of blurring degree given in the depth direction of the virtual three-dimensional space.

Figure 9:
FIG. 9 is a view explaining an example of the display screen in the case of applying the blurred drawing processing method of the present invention to the display of a screen of a fighting game.

As shown in FIG. 9, in a fighting game where an enemy character going to fight with a player character moves between a front side and a deep side of a virtual three-dimensional space, it is possible to set the positions of threshold values (Zmin, Za, Zb, and Zmax) in the depth direction of the virtual three-dimensional space so that the side deeper than the player character in the virtual three-dimensional space becomes blurred.

In this case, even if the enemy character moves from the deep side to the front side of the virtual three-dimensional space, the blurred displayed image of the enemy character will never abruptly change to a highly focused image. Due to this, there is never an unnatural change in scene where it appears that the enemy character breaks through a curtain of fog.

Note that the method of blurred drawing processing explained in the above embodiment may be realized by execution of a prepared program by a personal computer, video game system, etc. The program for blurred drawing processing is stored in a hard disk, floppy disk, CD-ROM, magneto-optic disk (MO), digital versatile disk (DVD), or other computer readable program product and executed by being read from the program product by a computer. Further, the program may be distributed through such a program product or through the Internet or other networks.

Summarizing the effects of the invention, as will be understood from the above explanation, according to the present invention, there is provided a method of blurred drawing processing for three-dimensional computer image processing and a computer readable program product storing a program and video game system for the same which convert a three-dimensional image to a two-dimensional image, acquire depth data showing a depth position in the virtual three-dimensional space of the two-dimensional image, repeatedly perform blurring processing for blurring the two-dimensional image at the deeper side from a threshold value for each of a plurality of threshold values set in steps in the depth direction of the virtual three-dimensional space, and perform semitransparency processing on the two-dimensional image at the deeper side from the threshold value with each blurring processing, so it is possible to display a virtual three-dimensional space on a screen having the effect of a depth of field free from an unnatural feeling without increasing the number of steps of blurring degree given in the depth direction of the virtual three-dimensional space and without increasing the load of the blurred drawing processing.

While the invention has been described by reference to specific embodiments chosen for purposes of illustration, it should be apparent that numerous modifications could be made thereto by those skilled in the art without departing from the basic concept and scope of the invention.

The present disclosure relates to subject matter contained in priority Japanese Patent Application No. 2000-020969, filed on Jan. 28, 2000, the contents of which is herein expressly incorporated by reference in its entirety.

What is claimed is:

1. A method for blurring a scene of a game, the method including:
   setting a depth from any perspective point for a scene in a virtual space,
   setting a blurring degree higher the deeper the set depth, the blurring degree being uniform up to a predetermined distance from said perspective point and increasing in steps behind said predetermined distance,
   executing blurring processing on said scene based on the set blurring degree, and
   displaying the scene obtained by the executed blurring processing.

2. The method as set forth in claim 1, wherein said blurring processing combines a blurred image prepared in advance with the depth of the scene step by step.

3. The method as set forth in claim 2, wherein the blurred image prepared in advance is an image comprised of the image of the scene subjected to a predetermined blurring processing.

4. The method as set forth in claim 3, wherein said predetermined blurring processing is processing for reducing and enlarging the image of the scene.

5. The method as set forth in claim 4, wherein said blurring degree shows the number of times of combination of the blurred image prepared in advance and the blurring processing executes the combination processing in accordance with the number of times of combination in which the blurring degree corresponds to the set depth.

6. The method as set forth in claim 1, wherein the blurred image is a semitransparent image, the set depth is subjected to combination processing by semitransparent combination using said blurred image, and said blurring processing combines a blurred image prepared in advance a number of times corresponding to the depth of the scene.

7. A computer readable program product storing a game program, the program making the computer:
   set a depth from any perspective point for a scene in a virtual space;
   set a blurring degree higher the deeper the set depth, the blurring degree being uniform up to a predetermined distance from said perspective point and increasing in steps behind said predetermined distance;
   execute blurring processing based on said set blurring degree to said scene; and
   display the scene obtained by said executed blurring processing.

8. The program product as set forth in claim 7, wherein said blurring processing combines a blurred image prepared in advance with the depth of the scene step by step.

9. The program product as set forth in claim 8, wherein the blurred image prepared in advance is an image comprised of the image of the scene subjected to a predetermined blurring processing.

10. The program product as set forth in claim 9, wherein said predetermined blurring processing is processing for reducing and enlarging the image of the scene.

11. The program product as set forth in claim 8, wherein said blurring degree shows the number of times of combination of the blurred image prepared in advance and the blurring processing executes the combination processing in accordance with the number of times of combination in which the blurring degree corresponds to the set depth.

12. The program product as set forth in claim 7, wherein the blurred image is a semitransparent image, the set depth is subjected to combination processing by semitransparent combination using said blurred image, and said blurring processing combines a blurred image prepared in advance a number of times corresponding to the depth of the scene.

13. A game system provided with:
   a unit for playing a game in accordance with a program;
   a memory for storing at least a part of the program; and
   a display screen for displaying the game played by the unit, the unit,
   in accordance with the program stored in the memory,
   setting a depth from any perspective point for a scene in a virtual space;
   setting a blurring degree higher the deeper the set depth, the blurring degree being uniform up to a predetermined distance from said perspective point and increasing in steps behind said predetermined distance;
   executing blurring processing on said scene based on the set blurring degree; and
   displaying the scene obtained by the executed blurring processing.

14. The game system as set forth in claim 13, wherein in said unit, said blurring processing combines a blurred image prepared in advance with the depth of the scene step by step.

15. The game system as set forth in claim 14, wherein the blurred image prepared in advance is an image comprised of the image of the scene subjected to a predetermined blurring processing.

16. The game system as set forth in claim 15, wherein said predetermined blurring processing is processing for reducing and enlarging the image of the scene.

17. The game system as set forth in claim 14, wherein said blurring degree shows the number of times of combination of the blurred image prepared in advance and the blurring processing executes the combination processing in accordance with the number of times of combination in which the blurring degree corresponds to the set depth.

18. The game system as set forth in claim 13, wherein the blurred image is a semitransparent image, the set depth is subjected to combination processing by semitransparent combination using said blurred image, and said blurring processing combines a blurred image prepared in advance a number of times corresponding to the depth of the scene.

* * * * *

UNITED STATES PATENT AND TRADEMARK OFFICE
CERTIFICATE OF CORRECTION

PATENT NO. : 6,409,598 B1
DATED : June 25, 2002
INVENTOR(S) : H. Takeuchi

It is certified that error appears in the above-identified patent and that said Letters Patent is hereby corrected as shown below:

<u>Title page,</u>
Item [30], the following should be added to the Foreign Application Priority Data:
-- Japanese Application Number 2000-020969, filed January 28, 2000 --

Signed and Sealed this

Fifteenth Day of April, 2003

JAMES E. ROGAN
*Director of the United States Patent and Trademark Office*